(12) United States Patent
Li et al.

(10) Patent No.: US 12,079,214 B2
(45) Date of Patent: Sep. 3, 2024

(54) ESTIMATING COMPUTATIONAL COST FOR DATABASE QUERIES

(71) Applicant: International Business Machines Corporation, Armonk, NY (US)

(72) Inventors: Shuo Li, Beijing (CN); Xiaobo Wang, Beijing (CN); Sheng Yan Sun, BeiJing (CN); Li Cao, Beijing (CN); Xin Peng Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 221 days.

(21) Appl. No.: 17/192,946

(22) Filed: Mar. 5, 2021

(65) Prior Publication Data
US 2022/0284023 A1 Sep. 8, 2022

(51) Int. Cl.
*G06F 16/2453* (2019.01)
*G06F 11/34* (2006.01)
*G06N 20/00* (2019.01)

(52) U.S. Cl.
CPC .... *G06F 16/24542* (2019.01); *G06F 11/3419* (2013.01); *G06F 16/24537* (2019.01); *G06N 20/00* (2019.01)

(58) Field of Classification Search
CPC ......... G06F 16/24542; G06F 16/24537; G06F 11/3419
See application file for complete search history.

(56) References Cited

U.S. PATENT DOCUMENTS

| | | | |
|---|---|---|---|
| 2005/0120000 A1 | 6/2005 | Ziauddin et al. | |
| 2009/0254916 A1* | 10/2009 | Bose | G06F 9/5066 718/104 |
| 2010/0125565 A1* | 5/2010 | Burger | G06F 16/2453 707/E17.131 |
| 2013/0226903 A1* | 8/2013 | Wu | G06F 16/24549 707/719 |
| 2014/0095472 A1* | 4/2014 | Lee | G06F 16/24542 707/718 |
| 2022/0058478 A1* | 2/2022 | Kuo | G06N 3/082 |
| 2022/0092067 A1* | 3/2022 | Zhu | G06F 16/24539 |

OTHER PUBLICATIONS

"IBM DB2 SQL Performance Analyzer User's Guide", Version 5, Release 1, IBM, Apr. 2018, 418 pages.
Yang, "SQL Query Optimization Meets Deep Reinforcement Learning", riselab, Published Date: Sep. 18, 2018, 9 pages.

(Continued)

*Primary Examiner* — Apu M Mofiz
*Assistant Examiner* — Farhad Agharahimi
(74) *Attorney, Agent, or Firm* — Daniel M. Yeates (57) ABSTRACT

A computer-implemented method to estimate computing cost of database queries. The method includes receiving a query. The method also includes generating one or more access plans for the query. The method further includes dynamically generating a learning model based on each of the generated access plans. The method includes estimating, by the learning model and for each of the one or more access plans, a predicted cost to execute the query. The method includes selecting, based on the predicted cost, a first access path associated with a lowest cost of the predicted costs and executing the query according the selected access path.

13 Claims, 8 Drawing Sheets

(56) References Cited

OTHER PUBLICATIONS

Marcus et al., "Neo: A Learned Query Optimizer", Proceedings of the VLDB Endowment, vol. 12, No. 11, Published Date: Jul. 2019, 14 pages.
"A method for time prediction on database system statistics collection and SQL rebind by machine learning", An IP.com Prior Art Database Technical Disclosure, IP.com No. IPCOM000254064D, IP.com Electronic Publication Date: May 31, 2018, 5 pages.
Mell et al., "The NIST Definition of Cloud Computing", Recommendations of the National Institute of Standards and Technology, Special Publication 800-145, Sep. 2011, 7 pages.

* cited by examiner

CREATE INDEX IDX_1 ON T2(C3)
CREATE INDEX IDX_2 ON T3(C3)

SELECT A.C4 B.C4 C.C4
FROM  T1 AS A,
      T2 AS B,
      T3 AS C
WHERE
      A.C1=B.C1
      AND B.C2 = C.C2
      AND A.C3 >= X
      AND B.C3 BETWEEN Y AND Z
      AND C.C3 = "Hello"
```

… # ESTIMATING COMPUTATIONAL COST FOR DATABASE QUERIES

BACKGROUND

The present disclosure relates to database management, and, more specifically, to estimating the computing cost of database queries.

Modern database systems can contain relatively large amounts of data. This data can be processed, updated, retrieved, and/or otherwise used to many purposes. Queries can be used to process the data. A single query can retrieve data from multiple data sources, which can result in a variety of potential flow paths to execute the query.

SUMMARY

Disclosed is a computer-implemented method to estimate a computational cost for database queries. The method includes receiving a query. The method also includes generating one or more access plans for the query. The method further includes dynamically generating, for each of the one or more access plans, a learning model based on each access plan. The method includes estimating, by the learning model, for each of the one or more access plans, a predicted cost to execute the query. The method also includes selecting, based on the predicted cost, a first access path associated with a lowest cost of the predicted costs. The method further includes executing the query according to the first access path. Further aspects of the present disclosure are directed to a system and a computer program product containing functionality consistent with the method described above.

The present Summary is not intended to illustrate each aspect of, every implementation of, and/or every embodiment of the present disclosure.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

While the present disclosure is amenable to various modifications and alternative forms, specifics thereof have been shown by way of example, in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

The present disclosure relates to database management, and, more specifically, to estimating computing cost for database queries. While not limited to such applications, embodiments of the present disclosure may be better understood in light of the aforementioned context.

Cloud Computing in General

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
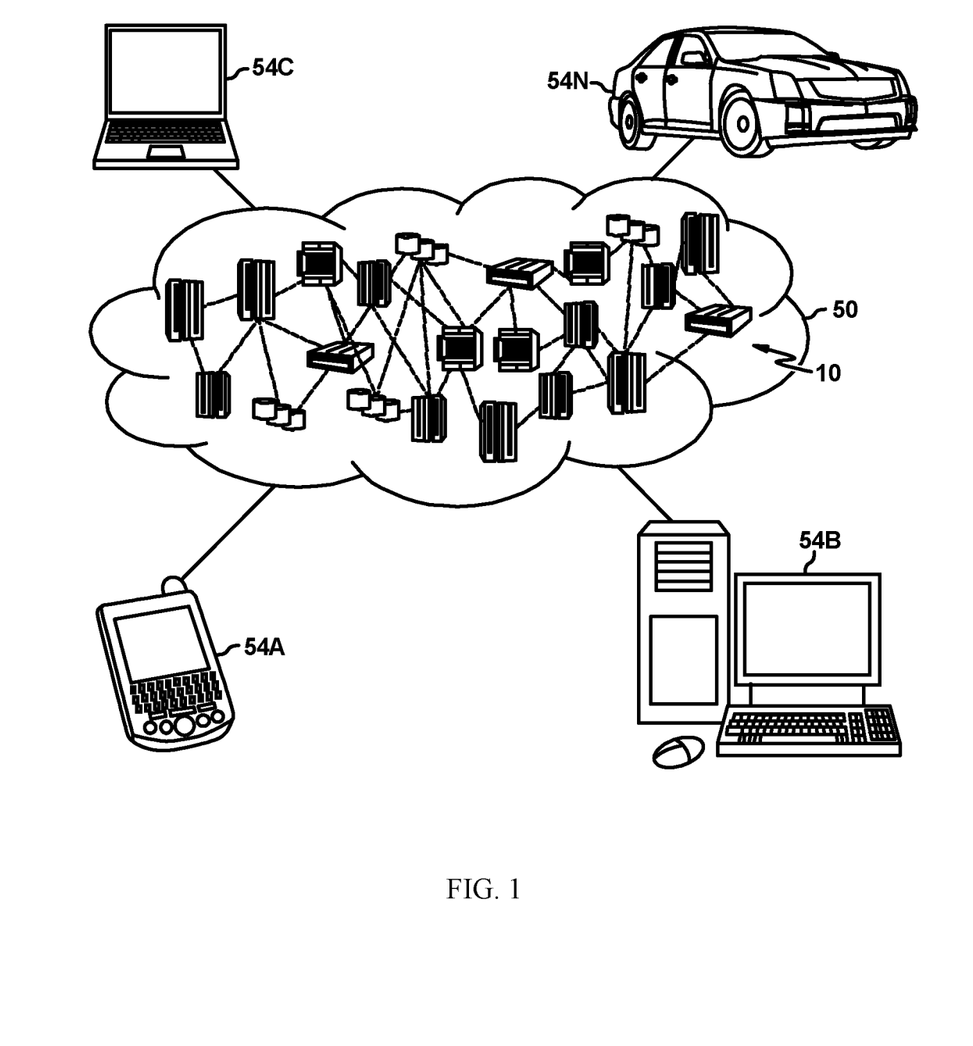
FIG. 1 depicts a cloud computing environment according to embodiments of the present disclosure.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
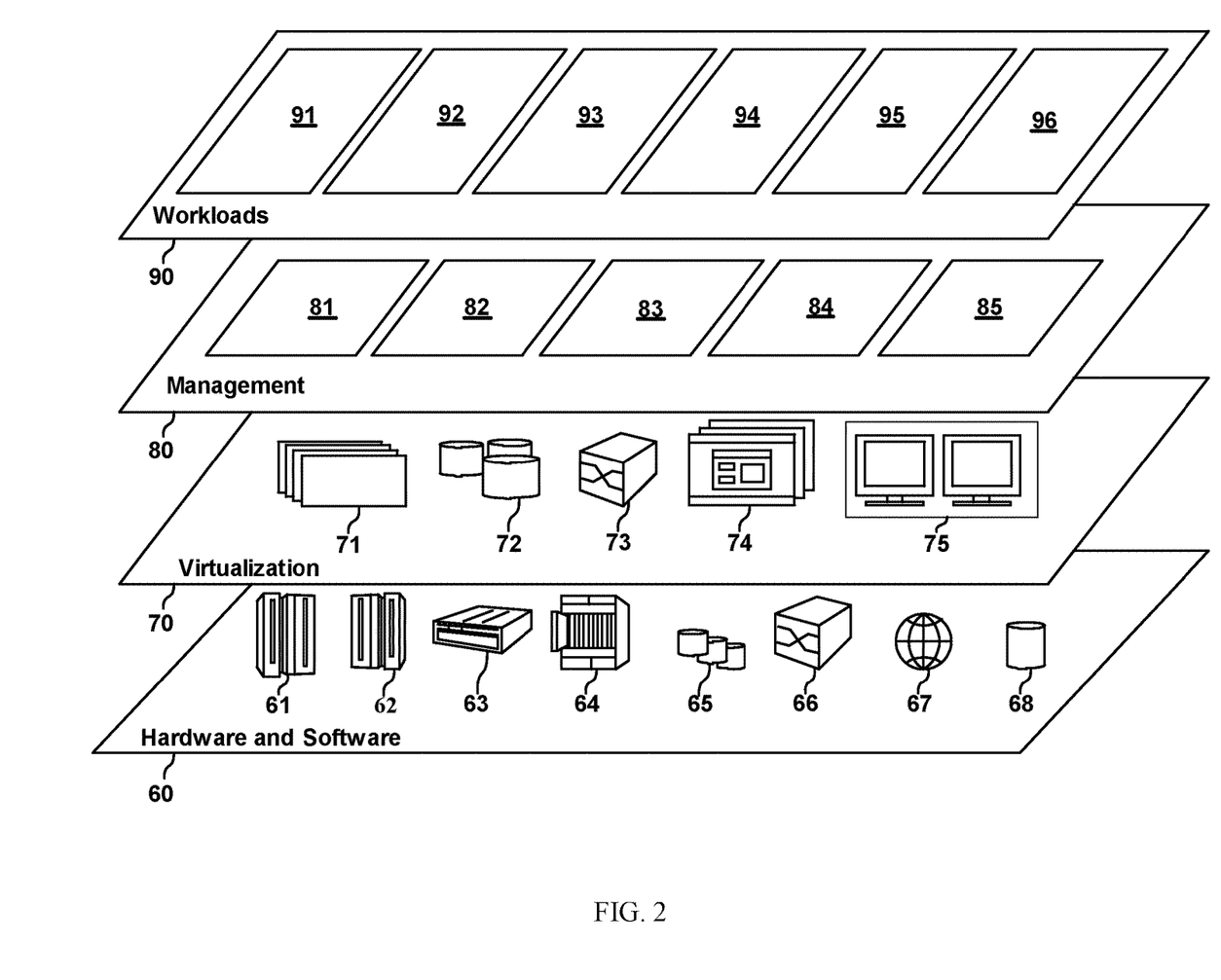
FIG. 2 depicts abstraction model layers according to embodiments of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and estimating computing cost to execute a query 96.

Figure 3:
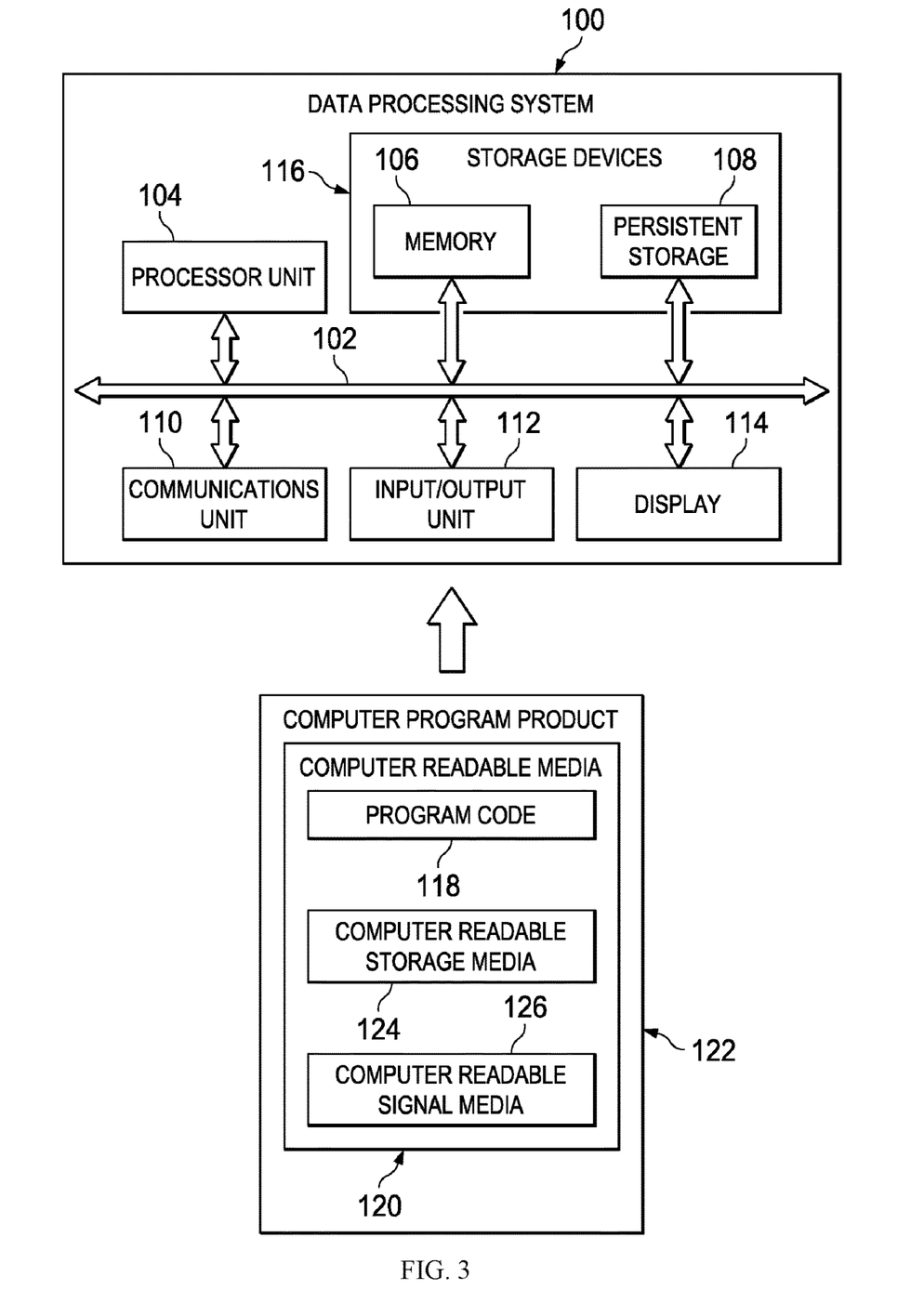
FIG. 3 is a block diagram of a DPS according to embodiments present disclosure.

FIG. 3 is a block diagram of an example DPS according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1.

Modern database systems can contain relatively large amounts of data. This data can be processed, updated, retrieved, and/or otherwise used to many purposes. Queries can be used to process the data. In some embodiments, the queries use standard query language (SQL). SQL is a programming language designed for managing (storing and/or retrieving) data stored in one or more databases.

In some embodiments, queries are generated by one or more applications. Each query can be configured to retrieve data from one or more of databases, tables, columns, and/or other data storage category. A query manager (or database system) parses the query and generates one or more access paths. The access path can identify the order in which the operations are performed on the data to fully execute (or complete) the query. The operations can include one or more of retrieving data, merging data, sorting data, writing (inserting) data, manipulating (e.g., performing calculations, etc.), and the like. As the complexity of a query increases, (e.g., more tables it draws from, the number of operations performed, etc.) the number of paths to execute the query increases. Each access path can have a different computational cost (or resource cost, computational cost, cost). In some embodiments, the query manager includes an optimizer. In some embodiments, the optimizer generates the one or more potential paths to execute the query.

The optimizer can estimate a cost to execute the query for each path and select and execute the lowest cost path. Accurately selecting the true lowest cost query path (or access path) can greatly increase the overall efficiency of database system. However, it can be difficult to accurately predict the cost of a query. Various factors such as data distribution (e.g., non-uniform distribution), uncertain SQL variables, obsolete database statistics, inaccurate/incomplete database statistics, etc., can cause differences between the estimated and actual cost. Increasing the accuracy of the estimated cost can cause a direct increase in the overall efficiency of the database system. Said differently, when the estimated cost is not accurate, it can introduce inefficiencies into the database system. For example, if the estimated cost of a first access path is lower than the estimated cost of a second access path, the optimizer will select the first access path. If the second access path has an actual cost lower than the first access path, then excess cost is being unnecessarily expended.

Embodiments of the present disclosure can estimate the cost of executing a query. In some embodiments, the cost can include CPU costs and I/O costs. In some embodiments, the cost can include elapsed time. For this application computing costs, or costs, can refer to one or more of CPU cost, I./O cost, elapsed time. Elapsed time can be a summation of CPU time, I/O time, and database suspension time. In some embodiments, CPU cost and/or I/O cost can be measured in milliseconds.

In some embodiments, a query manager receives and parses a query. In some embodiments, the query manager can generate one more access plans for each received query. In some embodiments, each access path includes one or more mini plans. A mini plan can be one logical operation of the query (e.g., fetch, sort, merge, etc.). The number of mini plans can be consistent with the number of scan, insert, update, join, and sort commands in the query. A mini plan can be a portion of an access plan. Said differently, each access plan can be divided into one or more mini plans.

Embodiments of the present disclosure can estimate a computational cost associated with a query. Embodiments of the present disclosure can use one or more learning models to estimate the cost of the query. In some embodiments, the query manager builds one or more learning models for the query. The learning model can be configured to estimate a computing cost required to fully execute the query. The learning model can be a nested layer model. In some embodiments, each mini plan can be associated with one or more models, or mini models. For purposes of this application, a mini model can be a learning model (machine learning model) that is associated with a mini plan of a query. A model for a query can contain more than one mini model. In some embodiments, each mini plan can include two or more mini models (e.g., a first mini model to estimate cost to perform the function and a second mini model to estimate a number of qualified rows). However, some uses of model can refer to a mini model as defined herein. The mini models can be configured to estimate a time to perform the mini plan. The mini models can also be configured to estimate a number of qualified rows that will be included in processing the query. In some embodiments, the number of qualified rows can be an input into a different model for a different (e.g., downstream in the access plan) mini plan.

In some embodiments, the query manager estimates the cost. The estimation can then be repeated for some or all of the remaining (no cost estimation performed) access plans generated by the optimizer. In some embodiments, the query manager can select and/or execute an access plan. The selection can be based the cost estimations. In some embodiments, the lowest cost access plan is selected. In some embodiments, if two or more access plans have a similar cost (within a threshold), then the access plan with the smallest number of mini plans can be selected. The results of the query can be stored and used to update the models.

Embodiments of the present disclosure can produce improved (more accurate) cost estimations than previous estimation techniques. The improved estimations can improve the overall efficiency of computing system. The improvement can be based on selecting the lowest cost access plan for a query. Additional improvements can be based on the improved estimation to improve planning/scheduling of database system resources.

The aforementioned advantages are example advantages, and embodiments exist that can contain all, some, or none of the aforementioned advantages while remaining within the spirit and scope of the present disclosure.

Figure 4:
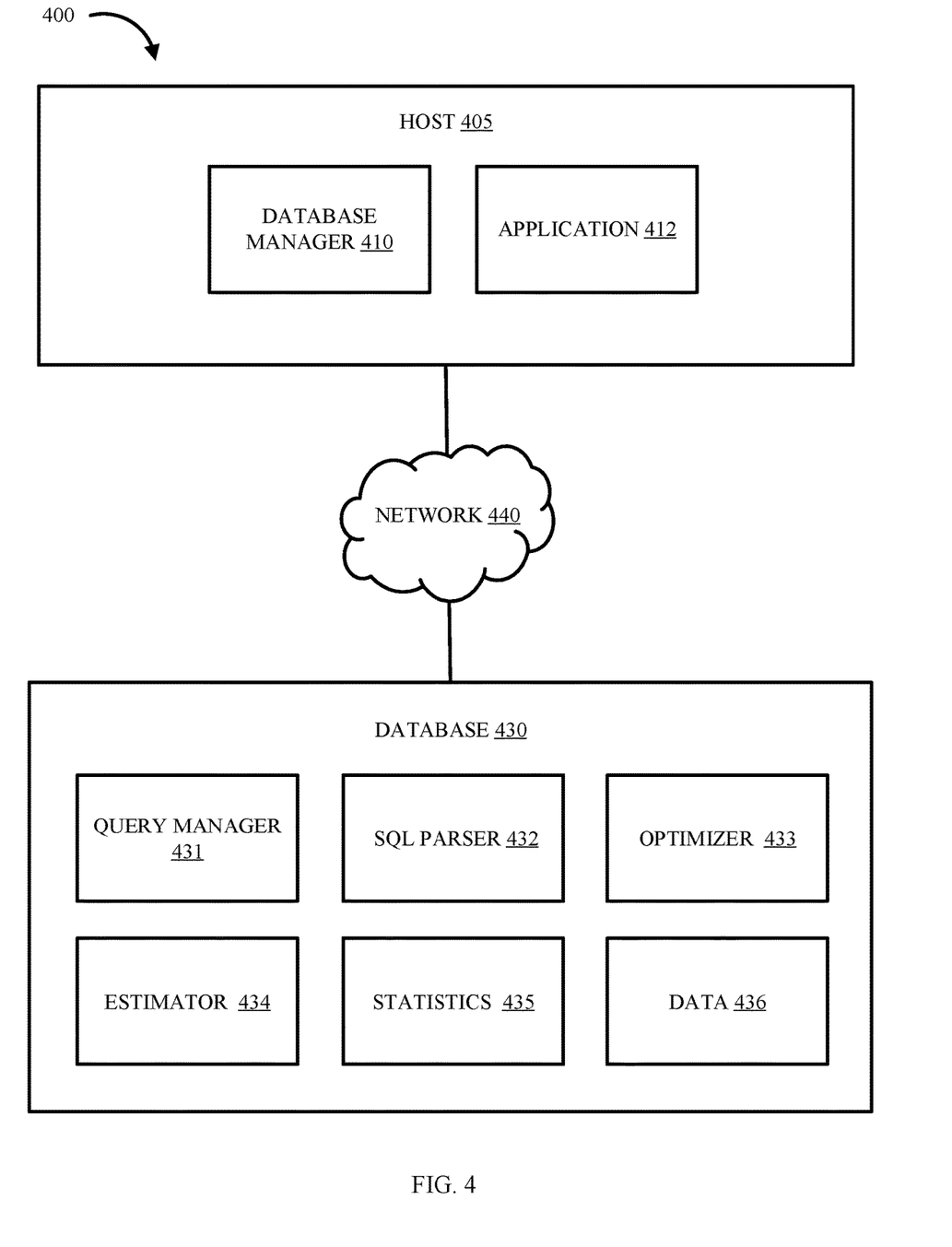
FIG. 4 is a functional diagram of a computing environment suitable for operation of a query manager according to embodiments of the present disclosure.

Referring now to various embodiments of the disclosure in more detail, FIG. 4 is a representation of a computing environment 400, that is capable of running a query manager in accordance with one or more embodiments of the present disclosure. Many modifications to the depicted environment may be made by those skilled in the art without departing from the scope of the disclosure.

Computing environment 400 includes host 405, database 430, and network 440. Network 440 can be, for example, a telecommunications network, a local area network (LAN), a wide area network (WAN), such as the Internet, or a combination of the three, and can include wired, wireless, or fiber optic connections. Network 440 may include one or more wired and/or wireless networks that are capable of receiving and transmitting data, voice, and/or video signals, including multimedia signals that include voice, data, and video information. In general, network 440 may be any combination of connections and protocols that will support communications between host 405, database 430, and other computing devices (not shown) within computing environment 400. In some embodiments, host 405, database 430, and/or the other computing devices in computing environment 400, can include a data processing system such as the data processing system 100 (shown in FIG. 3). In some embodiments, host 405, and database 430 are included in the same computing device, however, they are shown as separate for discussion purposes.

Host 405 can be a standalone computing device, a management server, a web server, a mobile computing device, or any other electronic device or computing system capable of receiving, sending, and processing data. In other embodiments, host 405 can represent a server computing system utilizing multiple computers as a server system, such as in a cloud computing environment 50 (shown in FIG. 1). In some embodiments, host 405 represents a computing system utilizing clustered computers and components (e.g., database server computers, application server computers, etc.) that act as a single pool of seamless resources when accessed within computing environment 400. In some embodiments, host 405 includes database manager 410 and application 412.

Database manager 410 can be any combination of hardware and/or software configured to manage database operations. The operations may include storing, retrieving, querying, manipulating, monitoring, and analyzing data along with other similar operations. In some embodiments, database manager 410 includes a database management system (DBMS). In some embodiments, database manager 410 is part of a federated database system (which can include database 430). A federated database system can transparently map multiple autonomous database systems into a single federated (combined) database. In some embodiments, a federated database system acts as a virtual database, where there is no actual data integration in the constituent databases.

Application 412 can be any combination of hardware and/or software that is configured to generate a query. A query can be a request for data and/or information stored in one or more tables of one or more databases. The databases may be local (e.g., on host 405), or remote (e.g., database 430). In some embodiments, application 412 sends the query to database manager 410. In some embodiments, the queries generated by application 412 can be sent as a batch to database manager 410 and/or database 430. In some embodiments, the queries can be sent on an as need basis and/or continuously. In some embodiments, application 412 is included in database manager 410. In some embodiments, application 412 can generate/send two or more different queries. In some embodiments, the query is generated in SQL. In some embodiments, application 412 displays the results of the query. The results may be returned in an SQL format, and/or as images, graphs, trends, and/or other similar formats.

In some embodiments, application 412 is part of a computing device separate from host 405. The computing device may communicate with host 405 via network 440. In some embodiments, the computing device can generate queries, send queries to host 405, and/or receive and display the results of the query. In some embodiments, application 412 can include (or be considered) two or more separate applications, wherein each application is configured to generate and send queries to database 430.

In some embodiments, host 405 includes one or more applications consistent with application 412. Or said differently, application 412 can include any number of unique applications. In some embodiments, computing environment 400 includes one or more additional computing devices that include an application consistent with application 412. In some embodiments, each application can generate the same and/or different queries than application 412.

Database 430 can be any combination of hardware and/or software configured to store data in a database system. In some embodiments, database 430 is part of a federated database system. A federated database system can be any number databases that appear as a single database to the requesting device (e.g., host 405, application 412, etc.). In some embodiments, database 430 includes two or more databases communicatively connected that can act as a single database. In some embodiments, database 430 may be contained within host 405. In some embodiments, database 430 can include query manager 431, SQL parser 432, optimizer 433, estimator 434, statistics 435, and data 436.

Query manager 431 can be any combination of hardware and/or software configured to oversee execution of an SQL query. In some embodiments, query manager 431 includes one or more of SQL parser 432, optimizer 433, estimator 434, and statistics 435. However, FIG. 4 depicts them as separate components for discussion purposes.

The SQL parser 432 can be any combination of hardware and/or software configured to determine actions to be performed from a query. In some embodiments, SQL parser 432 determines individual commands to fully execute the query (e.g., return a set of data). In some embodiments, SQL parser 432 develops an access path for the queries. The access path may include a stack (set) of commands, where each command is considered a node. In some embodiments, SQL parser 432 can include optimizer 433.

In some embodiments, SQL parser 432 can separate the access path into mini plan (query blocks). In some embodiments, each mini plan can include one fetch/retrieve (or equivalent) command. In some embodiments, the number of mini plans is consistent with the number of fetch/scan, join, sort, update, delete, and/or insert commands. In some embodiments, the number of mini plans can be based on the number of logical operations required to execute the query.

Optimizer 433 can be any combination of hardware and/or software configured to identify an efficient access path for a query. In some embodiments, the efficient access path can be the most efficient access path. In some embodiments, optimizer 433 generates one or more access paths for a query. Optimizer 433 can estimate a cost to execute the query for each of the access path. In some embodiments, the access path with the lowest estimated cost is selected and executed.

Estimator 434 can be any combination of hardware and/or software configured to estimate a cost to execute a query. In some embodiments, estimator 434 can divide the estimation into one or more sub-estimations. The sub-estimations can be correlated to a mini plan, or said differently, the estimation can include combining/adding an estimation for each mini plan.

In some embodiments, estimator 434 includes one or more learning models. The learning models can be any machine learning process. In some embodiments, the learning model can be trained, by training data, to estimate a cost to execute the query. In some embodiments, estimator 434 includes a nested layer network. In some embodiments, estimator 434 includes one or more separate models for each mini plan. The models can then be nested together to build the nested layer network. In some embodiments, nested layer model can include the one or more models from each query block. The output of one query block can be an input into the model of a second query block (e.g., the number of qualified rows output from a scan can be in input to merge model). In some embodiments, the nesting order/nesting configuration is based on the access path.

In some embodiments, a mini plan includes a single model (or single layer to be added to the nested layer model). In some embodiments, a mini plan includes two or more separate models/layers. The two or more models can include one model configured to estimate a cost to perform the access, and a second model configured to determine a number of qualified rows after mini plan execution. The training data for each model can include the values of the host variables (e.g., predicates, etc.), number of rows in the table, table cardinality, a column histogram, number of qualified rows, high key, low key, variance, cost, qualified rows, and/or other similar data based on each unique model. The input into each model can be the same as the training data with the exception of the expected output (e.g., estimated cost, qualified rows, etc.).

In some embodiments, the models are unique for each query. The input data/training data changes, based on the table, as it is unlikely that two table are identical. The exception to this is for sort models. Any sort model can be used across multiple queries.

In some embodiments, a sort command mini plan includes a single model. In some embodiments, the training data inputs for the sort command can include sort key size, number of rows to sort (e.g., number of qualified rows from a different mini plan model), and a cost. The inputs to run the model can be the same as the training input without the cost. The output of the model can be an estimated cost. In some embodiments, the sort model can be used across multiple queries, or said differently, the sort model is not dependent on the table/column of data being sorted. It is only dependent on the size of the data.

In some embodiments, a group by command can be a sub-type of a sort command. In some embodiments, the group by command can include two learning models. The first can be consistent with the sort model. The second model can output a number of qualified rows for each sort group. The training input can be the number of groups, and a number of qualified rows received as in input from a previous model.

In some embodiments, a database/table access mini plan can include two models. Database access methods can include table scan, table access, index access, relations space scan, and other similar database actions. Each access type can have a unique model. One model is configured to estimate a cost to perform the access, and a second model is configured to determine a number of qualified rows after mini plan execution. The number of qualified rows means the number of rows in the relevant column that meet the condition of the predicate in the query for the table. In some embodiments, the training data inputs for the cost estimation of a database access model includes the number of rows in the table, table cardinality and a cost. The inputs to run the model can be the same as the training input without the cost. The output of the model can be an estimated cost. Cardinality represents the uniqueness of data values contained in a particular row or table. The lower the cardinality, the more duplicate elements in a column. In some embodiments, the training data inputs for the estimation of number of qualified rows of an access model command can include values of the host variable, table cardinality, column cardinality, high key, low key, variance, a number of qualified rows. The inputs to run the model can be the same as the training input without the number of qualified rows. The output of the model can be an estimated number of qualified rows.

In some embodiments, update, delete, and insert mini plans can be considered as a table access. The models, training data, inputs, and output for update, delete, and insert mini plans can be consistent with those of table access models.

In some embodiments, an index scan mini plan can include two models. One model is configured to estimate a cost to perform the access, and a second model is configured to determine a number of qualified rows after mini plan execution. One model is configured to estimate a cost to perform the access, and a second model is configured to determine a number of qualified rows after mini plan execution. The number of qualified rows means the number of rows in the relevant column that meet the condition of the predicate in the query for the table. In some embodiments, the training data inputs for the cost estimation of an index scan model includes values of host variable under matching range predicate, column cardinality, high key, low key, variance, and cost. The inputs to run the model can be the same as the training input without the cost. The output of the model can be an estimated cost. In some embodiments, the training data inputs for the estimation of number of qualified rows of an access model command can include values of the host variable under the screening range predicate, column cardinality, high key, low key, variance, and the number of qualified rows. The inputs to run the model can be the same as the training input without the number of qualified rows. The output of the model can be an estimated number of qualified rows.

In some embodiments, a join mini plan can include two models. Join mini plans can include sort merge join, nest loop join, hash join, and the like. Each type of join command can have a unique model. One model is configured to estimate a cost to perform the join, and a second model is configured to determine a number of qualified rows after mini plan execution. In some embodiments, the training data inputs for the cost estimation of an index scan model includes qualified rows from the outer table, qualified rows from the inner table, and cost. The inputs to run the model can be the same as the training input without the cost. The output of the model can be an estimated cost. In some embodiments, the training data inputs for the estimation of number of qualified rows of a join command can include input variable values, outer table qualified rows, inner table qualified rows, histogram of join columns, and number of qualified rows. The inputs to run the model can be the same as the training input without the number of qualified rows. The output of the model can be an estimated number of qualified rows.

In some embodiments, estimator 434 may execute machine learning on data from the environment using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR). In some embodiments, the estimator 433 may execute machine learning using one or more of the following example techniques: principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), region-based convolution neural networks (RCNN), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

Statistics 435 can be any combination of hardware and/or software configured to store database statistics. In some embodiments, statistics 435 can include database statistics.

In some embodiments, statistics 435 tracks distribution of values in the tables and indexes in the database (e.g., data 436). In some embodiments, statistics 435 is updated and maintained by database manager 410. In some embodiments, statistics 435 includes frequency data. Frequency data represents the relative occurrence of a given value. In some embodiments, statistics 435 includes histograms. Histograms may represent relative occurrences of a range of values. For example, an equal depth histogram can divide the data into ranges of relatively the same size. A five category/card histogram will set boundaries for each column such that about 20% of the values are in each column. If a column has a single value that includes 20% of the entries, the card can be that single value, while another card can spread over a wide range of values.

In some embodiments, database statistics keeps a record of each query received. This can include the source of the query (e.g., application 412), the structure, the target data, and other similar data. In some embodiments, the records can be used as training data. For each query, all the data that can be used as training data (as described above) is stored. In some embodiments, the training data is stored based on source query. In some embodiments, the training data is stored by mini plan type. In some embodiments, the training data can be updated after each new query is executed and the statistics/data is recorded.

Data 436 can be any data structure configured to store and organize data. In some embodiments, data 436 can include one or more data structures. The data structures can include tables, indices (indexes), columns, and the like. The data structures can be the target of the queries. Data 436 can include one or more separate tables and/or one or more indexes. Each table/index can include one or more columns. In some embodiments, data 436 is a target of queries.

Figure 5:
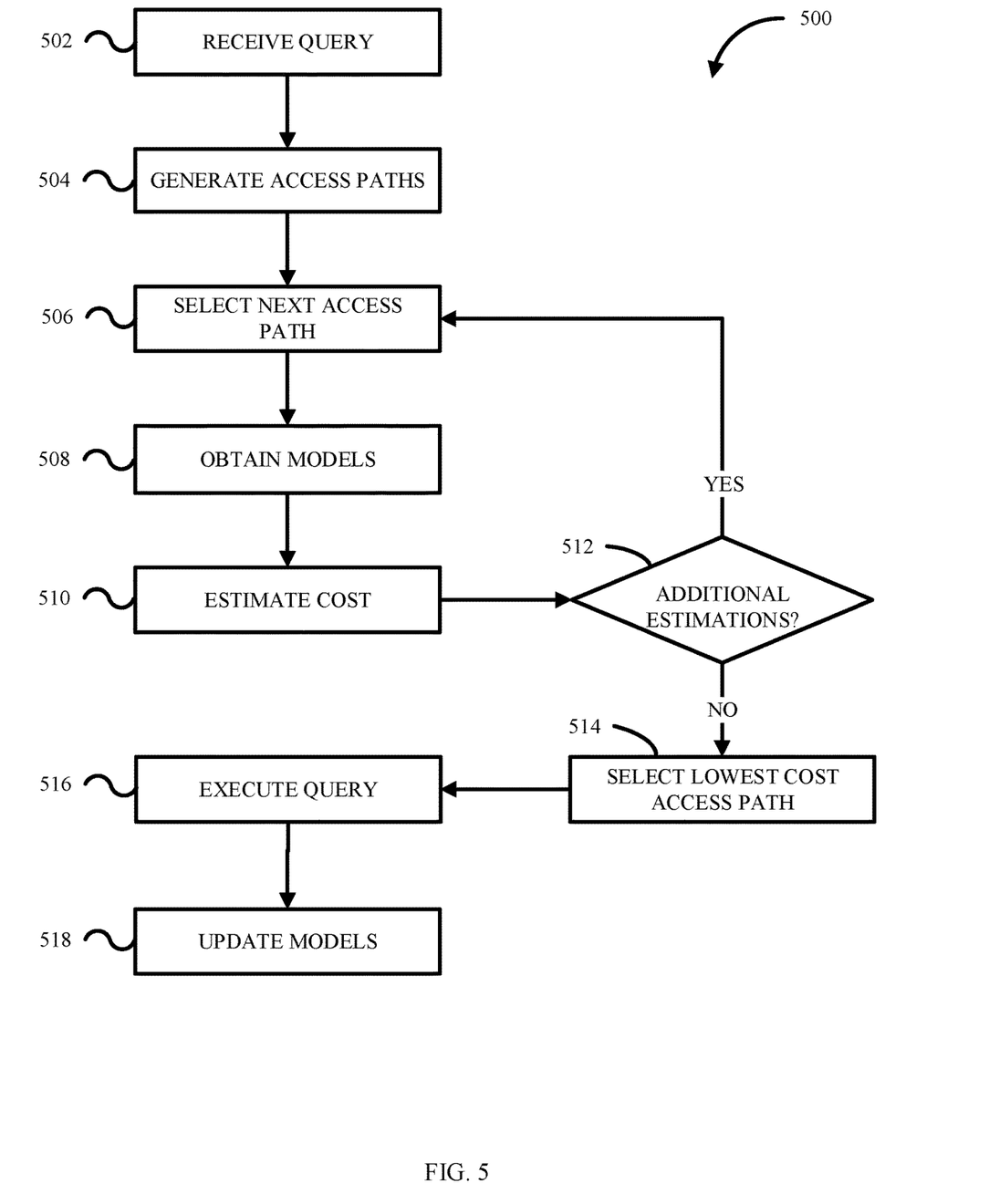
FIG. 5 is a flow chart of an example method to estimate the execution cost of a query batch according to embodiments of the present disclosure.

FIG. 5 is a flow chart of an example method, 500, to estimate a computation cost associated with executing a query according to embodiments of the present disclosure. The method 500 can be performed in a computing environment (e.g., computing environment 400 and/or cloud computing environment 50). One or more of the advantages and improvements described above for estimating computation costs of a query may be realized by method 500, consistent with various embodiments of the present disclosure.

Method 500 can be implemented by one or more processors, host 405, database manager 410, application 412, database 430, query manager 431, SQL parser 432, optimizer 433, estimator 434, statistics 435, data 436, and/or a different combination of hardware and/or software. In various embodiments, the various operations of method 500 are performed by one or more of host 405, database manager 410, application 412, database 430, query manager 431, SQL parser 432, optimizer 433, estimator 434, statistics 435, and/or data 436. For illustrative purposes, the method 500 will be described as being performed by query manager 431.

At operation 502, query manager 431 receives a query. In some embodiments, the query is received from application 420, data manager 410 and/or host 405. In some embodiments, the query is received in SQL. In some embodiments, the query is configured to perform one or more commands on a set of data, wherein the data is stored in database 430.

At operation 504, query manager 431 generates one or more access paths for the query. In some embodiments, the one or more access paths are generated by SQL parser 432 and/or optimizer 433. Each of the one or more access paths can be configured to retrieve, insert, and/or process all data necessary to execute the query. Each access path can be different from all other access path generated. In some embodiments, query manager 431 generates all potential access paths. In some embodiments, up to a predetermined number of potential access paths are generated (e.g., no more than five different access paths). In some embodiments, operation 504 includes parsing the query. In some embodiments, operation 504 includes extracting mini plans from each of the access paths.

At operation 506, query manager 431 selects one of the one or more access paths. The selected access path can be any of the one or more access paths without an associated estimated cost. One example access path is discussed in further detail below with reference to FIGS. 6A-6C.

At operation 508, query manager 431 estimates a cost to execute the selected query. In some embodiments, operation 508 includes extracting mini plans from the query. In some embodiments, query manager 431 divides the access path into one or more mini plans. In some embodiments, each mini plan can be associated with one database command. The command can be included in the access path. In some embodiments, the associated command is scan (e.g., table scan, index scan, etc.), a join (e.g., nest loop join, sort merge join, etc.), or a sort. Said differently, the number of mini plans in a query can be consistent with the number of scan, join, and sort commands in an access path.

At operation 508, query manager 431 obtains learning models for the access path. In some embodiments, one or more models for each mini plan is obtained. The models can be obtained from estimator 434. In some embodiments, obtaining the models includes building a nested layer model. The nested layer model can stack each of the models from each mini plan to prove a single cost estimation output. In some embodiments, the models obtained are based on the query, and/or the table/columns the query is configured to access.

At operation 510 query manager 431 estimates the cost of the selected access path. In some embodiments, the estimation is performed by the obtained models. Estimating the cost includes putting the input data, based on the query, into the model. The model will output an estimated cost. In some embodiments, the estimation can include an estimate for each mini plan and an overall estimate. The overall estimate can be a summation of each estimation for all the cost estimation mini plans.

At operation 512, query manager 431 determines if there are additional cost estimations to perform. In some embodiments, no additional estimations are needed if a predetermined number (e.g., threshold, setpoint, etc.) of access paths have been estimated. In some embodiments, additional cost estimations are needed if any access path generated at operation 504 does not have an associated cost estimate. If query manager 431 determines there are additional cost estimations to perform (512:YES), then query manager 431 returns to operation 506. If query manager 431 determines there are no additional cost estimations to perform (512: NO), then query manager 431 proceeds to operation 514.

At operation 514, query manager 431 selects the lowest cost access path. In some embodiments, the identification is based on comparing the cost of each estimations. The lowest can be any category of cost (e.g., time, CPU usage, etc.).

At operation 516, query manager 431 executes the query. The query is executed using the identified lowest cost access path. During execution, all relevant data (e.g., data that can be used for training data) can be recorded. Executing the query can include performing all actions of the selected access plan and returning the data to the source of the query.

At operation 518, query manager 431 updates the models. The update can be based on the gathered data. In some embodiments, operation 518 includes executing one or more of the access paths that were not executed at operation 516 (or selected at operation 514). This data can be recorded and added to the training data. The alternate executions can also be used to increase the accuracy of the models.

Figure 6A:
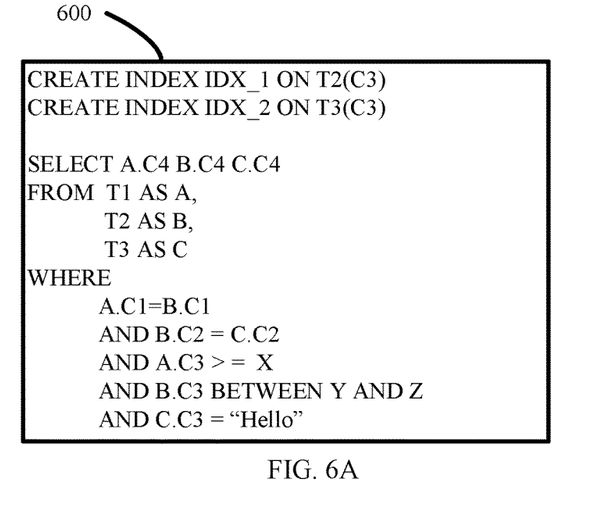
FIG. 6A is an example structured query language (SQL) query according to embodiments of the present disclosure.
Figure 6B:
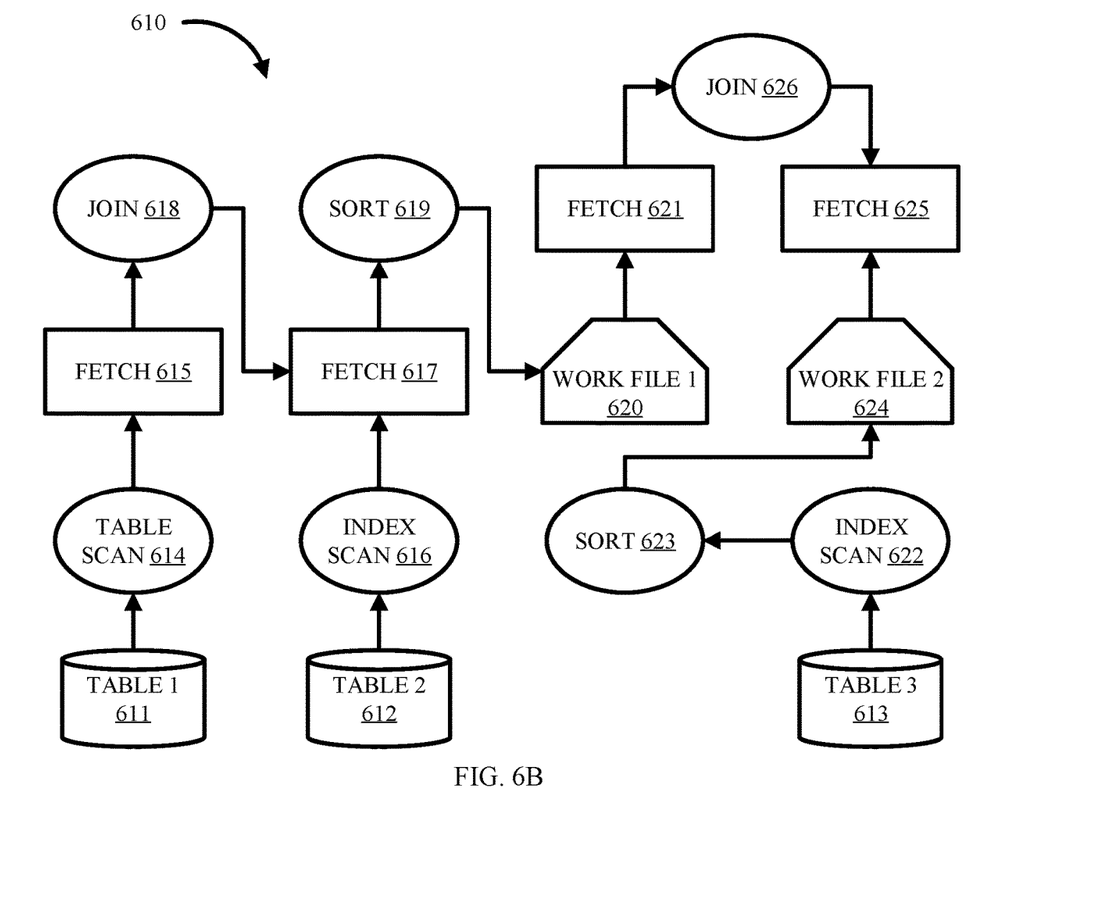
FIG. 6B is an example access path for the SQL query according to embodiments of the present disclosure.
Figure 6C:
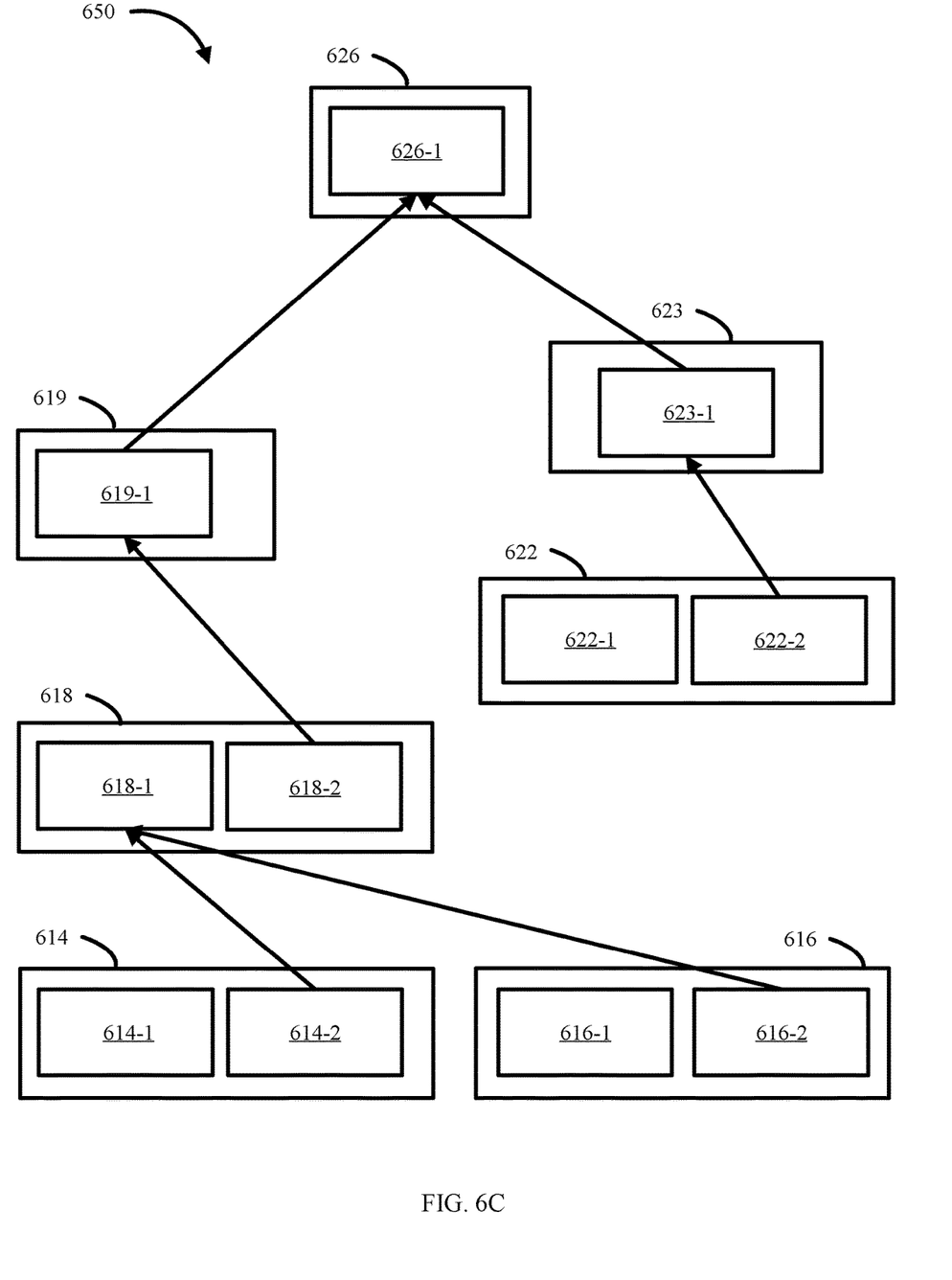
FIG. 6C is an example model tree for the SQL query according to embodiments of the present disclosure.

FIGS. 6A-6C illustrate one embodiment of how method 500 can be implemented. FIG. 6A includes an example query 600. Query 600 includes 3 tables (T1, T2, and T3) and five columns (A.C1, B.C1, etc.) and "Hello" can represent a string. Each of X, Y, and Z, can represent any number.

FIG. 6B represents an access path 610 for query 600. The arrows can represent a data flow through access path 610. Access path 610 includes table 1 611, table 2 612, and table 3 613. A query manager can perform table scan 614 and fetch 615 on table 1 611. Query manager then performs an index scan 616 from table 2 612 and fetch 617 from index scan 616. Next, query manager perform join 618 of the fetch 615 and fetch 617. Query manager may then sort 619 and convert to work file 1 620 and fetch 621 from work file 1 620. Query manager will index scan 622 from table 3 613, perform sort 623, then convert to working file 2 624 and fetch 625 from work file 2 624. Last, query manager will join the fetch 621 and fetch 625.

FIG. 6C displays a model tree 650. Model tree 650 includes table scan 614, index scan 616, join 618, sort 619, index scan 622, sort 623, and join 626. Model tree 650 includes one access plan, and the process can be repeated for each access plan generated at operation 504. Each arrow represents the output of one model being inputted into a different learning model. Each number after the hyphen represents a type of model. −1 is cost estimation, and −2 is an estimation of qualified rows.

The query manager 431 will obtain the needed models depicted in model tree 650 (each model can be obtained as needed, rather than together). Model 614-1 estimates the cost of table scan 614 and 614-2 to estimate qualified rows from table 1. Model 616-1 will estimate a cost to perform index scan 616. Model 616-2 will estimate qualified rows from table 2. The output of model 614-2 and 616-2 will be input, along with the other inputs, to model 618-1, and the output will be a cost to complete the join 618. Next, model 618-2 will estimate the number of qualified rows that result from the join. The output from 618-2 will be input into model 619-1. The output of model 619-1 will be a cost to sort the joined tables.

Next, the query manager will use models 622-1 and 622-2 for an index scan. Model 622-1 will estimate a cost to perform the index scan 622. Model 622-2 will then estimate a number of qualified rows from Table 3 613. The output of model 622-2 will be input in model 623-1, and model 623-1 will estimate a time to sort. In some embodiments, models 619-1 and 623-1 can be the same model, they will just receive different input based on their location in the access path.

Sort 619 and sort 623 only have a single model, and the sort does not alter the number of rows. The number of qualified rows that are input into model 619-1 and 623-1 can be used as an input into a higher level model. In some embodiments, the outputs of 618-2 and 622-2 are input into model 626-1. Model 626-1 will receive the inputs of qualified rows from 619-1 (or 618-2) and 623-1 (or 622-2), along with the other inputs of a join model, to estimate the cost of join 626. In some embodiments, sort command include two separate mini models. The second model can be configured to estimate the number of qualified rows. The second mini model of a sort command can output the input of qualified rows in the first mini model of the sort command. A sort does not alter the number of rows. In some embodiments, the second mini model for a sort command can be incorporated into the first model. The first model can output a number of rows equal to the input if needed.

Finally, the query manager 431 can sum all of the costs of models 614-1, 616-1, 618-1, 619-1, 622-1, 623-1, and 626-1 to determine a total cost estimate to execute this query. This process can be generated for each generated access path.

In some embodiments, each model in model tree 650 can be nested together to form a single nested layer model. Model tree 650 can be an outline of the nested layers and their interactions. Additionally, for each model, the inputs can include data beyond the output of the other models depicted. FIG. 6C depicts one embodiment of the models connected/nested to estimate an overall cost. It should not be considered limiting in any way.

Figure 7:
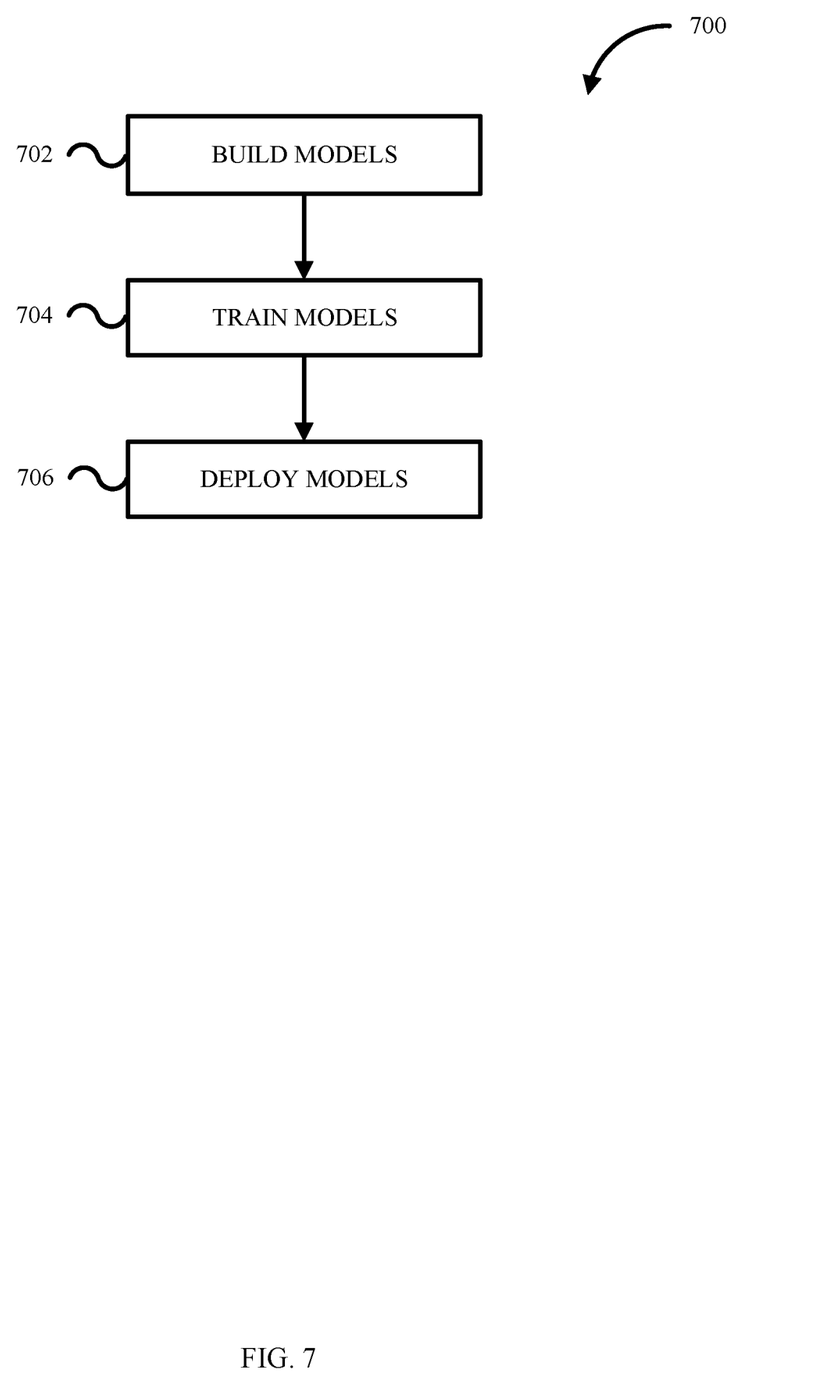
FIG. 7 is a flow chart of an example method to train and deploy learning models according to embodiments of the present disclosure.

FIG. 7 is a flow chart of an example method, 700, to train and deploy learning models according to embodiments of the present disclosure. The method 700 can be performed in a computing environment (e.g., computing environment 400 and/or cloud computing environment 50).

Method 700 can be implemented by one or more processors, host 405, database manager 410, application 412, database 430, query manager 431, SQL parser 432, optimizer 433, estimator 434, statistics 435, data 436, and/or a different combination of hardware and/or software. In various embodiments, the various operations of method 700 are performed by one or more of host 405, database manager 410, application 412, database 430, query manager 431, SQL parser 432, optimizer 433, estimator 434, statistics 435, and/or data 436. For illustrative purposes, the method 700 will be described as being performed by query manager 431.

At operation 702, query manager 431 generates learning models. In some embodiments, one or more models (or mini models) is built for each logical command of a query. In some embodiments, a model is built for each unique query received by query manager 431. In some embodiments, each mini plan has two associated mini models. A first mini model is configured to estimate a cost to perform the associated logical operation. The second mini model is configured to estimate a number of qualified rows for the logical operation. The number of qualified rows can be based on the predicates received in the query.

At operation 704, query manager 431 trains the models. The models can be trained by training data. Each model can have a set of training data as described above. At operation 706, query manager 431 deploys the models. In some embodiments, deploying the models includes making the models available. The deployed models can be obtained at operation 508 of method 500. In some embodiments, deploying the models includes updating the models (e.g., operation 518). Method 700 can be performed before and/or concurrently with method 500.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving a query;
   generating two or more access plans for the query;
   dynamically generating, in response to the generating the two or more access plans and for each of the two or more access plans, a machine learning model based on each access plan, wherein the dynamically generating includes extracting, for each of the two or more access plans, a set of mini plans, the extracting includes dividing each access plan into the set of mini plans, each mini plan has an associated command in the query and each mini plan is associated with at least one mini model;

estimating, by the machine learning model, for each of the two or more access plans, a predicted resource cost to execute the query, wherein each mini plan is associated with a first mini model and a second mini model, wherein the first mini model is configured to estimate a resource cost to perform the associated command, based on a number of qualified rows, and the second mini model is configured to estimate the number of qualified rows for the associated command;

selecting, based on the predicted resource cost, a first access plan associated with a lowest resource cost of the predicted resource costs; and executing, in response to the selecting, the query according to the first access plan.

2. The method of claim 1, wherein the generating of the machine learning model includes stacking each mini model for each mini plan of the access plan, and a configuration of the stacking is based on the access plan.

3. The method of claim 2, wherein the machine learning model is a nested layer model.

4. The method of claim 1, wherein each mini plan is associated with a command selected from the group consisting of a database access, an index scan, a join command, a delete command, an insert command, and an update command.

5. The method of claim 1, wherein the estimating further comprises:
obtaining an estimated resource cost from the first mini model of each mini plan of an access plan; and
adding each estimated resource cost to obtain a total estimated resource cost.

6. The method of claim 1, wherein an output of the second mini model for a first mini plan is an input to the first mini model of a second mini plan.

7. The method of claim 1, further comprising:
building a plurality of mini models, wherein each mini model of the plurality of mini models is associated with a query command;
training each model of the plurality of models; and
deploying each model of the plurality of models.

8. The method of claim 7, further comprising:
selecting a second access plan;
executing the second access plan;
storing, for the first access plan and for the second access plan, a set of execution data; and
updating, based on each set of execution data, the plurality of mini models.

9. A system comprising:
a processor; and
a computer-readable storage medium communicatively coupled to the processor and storing program instructions which, when executed by the processor, are configured to cause the processor to:
receive a query;
generate two or more access plans for the query;
dynamically generate, in response to the generating the two or more access plans and for each of the two or more access plans, a machine learning model based on each access plan, wherein, the dynamically generating includes extracting, for each of the two or more access plans, a set of mini plans, the extracting includes dividing each access plan into the set of mini plans, each mini plan has an associated command in the query and each mini plan is associated with at least one mini model;

estimate, by the machine learning model, for each of the two or more access plans, a predicted resource cost to execute the query, wherein each mini plan is associated with a first mini model and a second mini model, wherein the first mini model is configured to estimate a resource cost to perform the associated command, based on a number of qualified rows, and the second mini model is configured to estimate the number of qualified rows for the associated command;

select, based on the predicted resource cost, a first access plan associated with a lowest resource cost of the predicted resource costs; and execute, in response to the selecting, the query according to the first access plan.

10. The system of claim 9, wherein the generation of the machine learning model includes stacking each mini model for each mini plan of the access plan, and a configuration of the stacking is based on the access plan.

11. The system of claim 10, wherein the machine learning model is a nested layer model.

12. A computer program product, the computer program product comprising a computer readable storage medium having program instructions embodied therewith, the program instructions executable by a processing unit to cause the processing unit to:
receive a query;
generate two or more access plans for the query;
dynamically generate, in response to the generating the two or more access plans and for each of the two or more access plans, a machine learning model based on each access plan, wherein:
the dynamically generating includes extracting, for each of the two or more access plans, a set of mini plans, the extracting includes dividing each access plan into the set of mini plans, each mini plan has an associated command in the query and each mini plan is associated with at least one mini model;
each mini plan is associated with a first mini model and a second mini model, wherein the first mini model is configured to estimate a resource cost to perform the associated command, and the second mini model is configured to estimate a number of qualified rows for the associated command; and
the generating of the machine learning model includes stacking each mini model for each mini plan of the access plan, and a configuration of the stacking is based on the access plan;

estimate, by the machine learning model, for each of the two or more access plans, a predicted resource cost to execute the query;

select, based on the predicted resource cost, a first access plan associated with a lowest resource cost of the predicted resource costs; and execute the query according to the first access plan.

13. The computer program product of claim 12, wherein the machine learning model is a nested layer model.

* * * * *